Feb. 22, 1949.    T. J. YOUNG ET AL    2,462,152
COMBINATION SWEEP RAKE AND STACKER
Filed Feb. 21, 1947    3 Sheets-Sheet 1
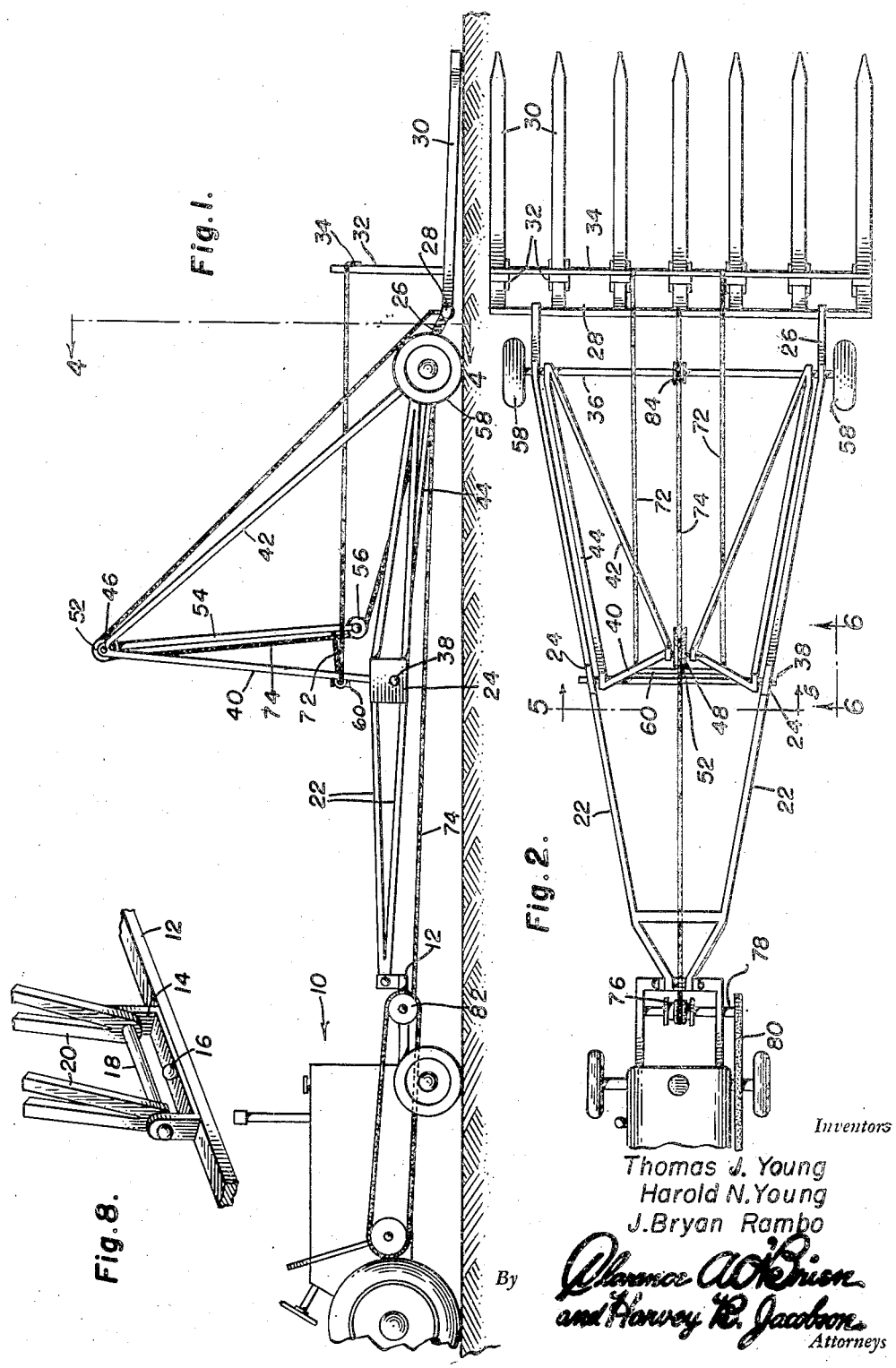
Inventors
Thomas J. Young
Harold N. Young
J. Bryan Rambo

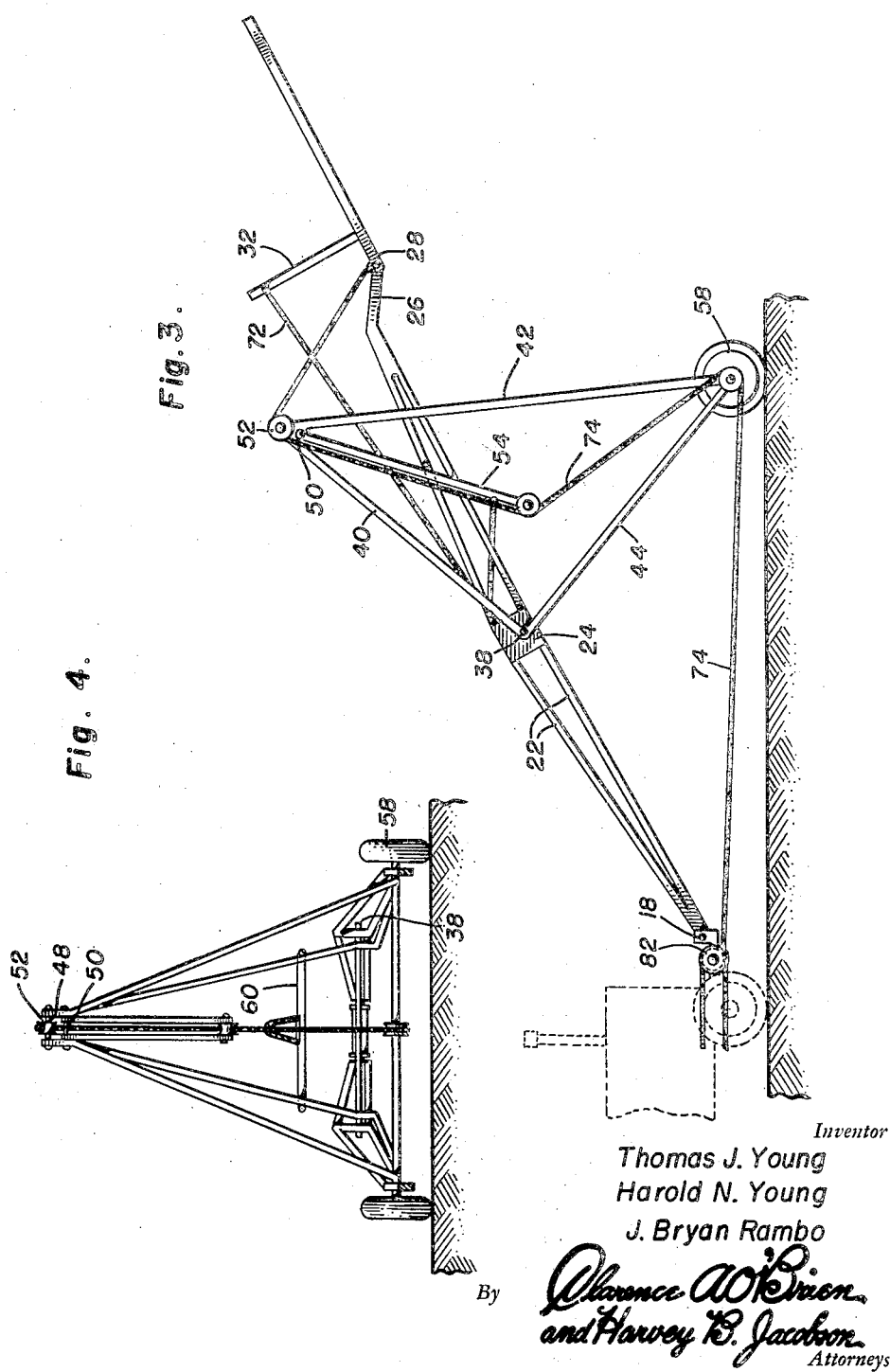

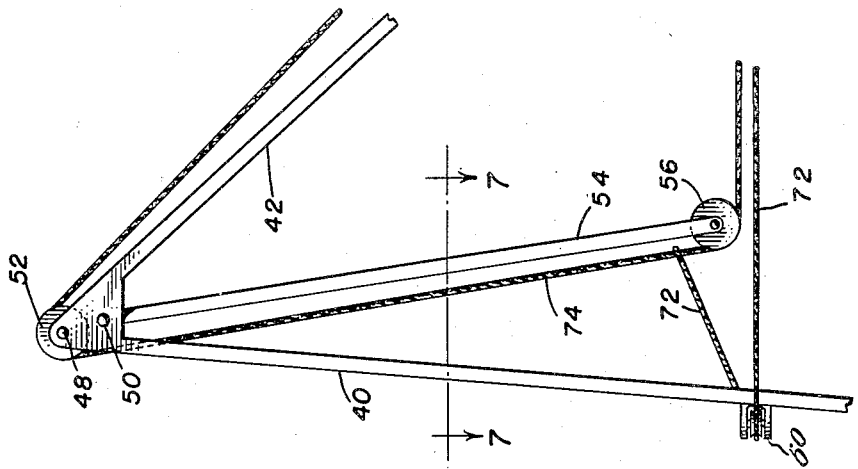
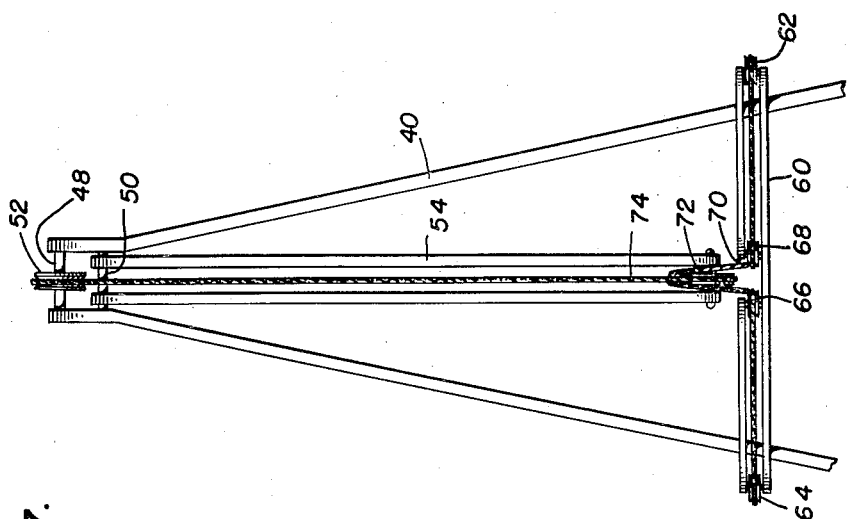
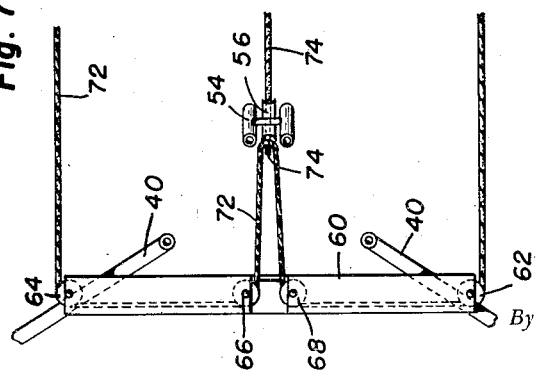

Patented Feb. 22, 1949

2,462,152

UNITED STATES PATENT OFFICE 2,462,152

COMBINATION SWEEP RAKE AND STACKER

Thomas J. Young, Harold N. Young, and
Jennings Bryan Rambo, Meridian, Idaho

Application February 21, 1947, Serial No. 729,982

4 Claims. (Cl. 214—131)

This invention relates generally to agricultural implements, and more particularly to a combination sweep rake and stacker adapted to be secured to the front of a tractor by a universal hitch and having wheels at the front end thereof, the frame having a sub-frame incorporated therewith in a manner allowing the frame, with the rake portion secured at the front end thereof, to be tilted upwardly, whereby the implement may be used to gather a considerable quantity of hay, or the like, while the frame is in depressed position, the implement then being used to transport this hay to a predetermined location where the same is to be stacked, the tilting or elevation of the rake greatly facilitating the stacking operation.

It is a primary object of this invention to provide a device which will expeditiously gather the crop, transport the same, and finally elevate the same to the required height, that is, the gradually increasing height of the stack as the stack is formed.

Another object of this invention is to provide a combination rake and stacker wherein the rake may be tilted upwardly at the forward end, with reference to the tiltable frame, thus adapting the device for transporting the hay a considerable distance without loss, the means for carrying out this object including right angularly disposed portions at the heel or rear of the rake and cable means secured to the rake in such a manner as to facilitate the tilting of the rake so that the hay will be supported in a considerable degree upon these right angularly disposed portions.

Another object of this invention is to combine a single cable with the cable described in the immediately preceding object, in such manner that the tensioning of this single cable, ordinarily accomplished by winding the same on a drum mounted on the tractor, will first tilt the rake with reference to the tiltable frame, further tensioning of the cable resulting in the frame and the rake being elevated, this simplified single control being thought of as of primary importance in this invention.

Another object of this invention is to provide means in a device of this character, whereby the frame may be raised to any desired height, within the limits of the construction thereof.

And a last object to be specifically mentioned is to provide a device of this character which is relatively inexpensive and practicable to manufacture, extremely convenient and simple to use, easily secured to and removed from a tractor, and which is generally efficient and durable in service.

With these and other objects definitely in view, this invention resides in certain novel features of construction, combination and arrangement of parts and portions as will be hereinafter described in detail and particularly set forth in the appended claims, reference being had to the accompanying drawings which form a material part of this application, and in which:

Figure 1 is a side elevational view of this invention, together with a fragmentary view of a tractor equipped to operate the same;

Figure 2 is a top or plan view of the structure illustrated in Figure 1;

Figure 3 is a side elevational view of the implement, with the frame in elevated position, a fragmentary phantom view of the tractor being included in the figure to illustrate the use of the universal hitch required for the proper operation of this device;

Figure 4 is a view, largely in elevation, and taken on the line 4—4 in Figure 1;

Figure 5 is a fragmentary elevational view, taken substantially on the line 5—5 in Figure 2;

Figure 6 is an enlarged detail view, side elevational in character of the upper portion of the sub-frame and the structure carried thereby;

Figure 7 is a horizontal view, with the parts shown largely in plan, and taken on the line 7—7 in Figure 6; and, Figure 8 is an enlarged detail view, in perspective, of the rear end portion of the frame and the universal hitch, representing one means of securing this implement to the forward end of a tractor.

Similar characters of reference designate similar or identical parts and portions throughout the specification and throughout the several views of the drawings.

Referring now to the drawings in detail, it will be noted that this implement is adapted to be secured to the front end of a tractor, generally represented by the numeral 10, the tractor being necessarily equipped with a forwardly projecting member 12, whereon a U-shaped member 14 is pivotally secured as indicated at 16, by means of a large bolt and any other anti-friction attaching devices desired. This structure allows for pivotal movement of the U-shaped member 14, in a horizontal direction. This U-shaped member is provided with a horizontally disposed bar 18, secured in the apertured arms of the U-shaped member and adapted to mount the rear ends 20 of the frame of the implement. This frame is of open construction and will normally be comprised of tubular or bar stock, the drawings representing one preferred manner of fabrication in which the lateral members 22 of the frame are of twin or double construction, as shown, a pair of gusset plates 24 being integrally secured to the lateral members 22, at points intermediate the ends of the said lateral members. At the forward ends of these lateral members, a pair of angularly depending portions 26 are provided for the pivotal mounting thereon of a cross member 28.

This cross member 28 carries a plurality of substantially parallel spaced teeth or tangs 30 which extend forwardly and substantially horizontally, when the frame is in depressed position, and the forward ends of these tangs 30 are sharpened. Right-angularly disposed portions, which may be integral with the said tangs 30, comprise a rear wall for the rake, it being understood that these right angularly bent portions, designated at 32 are integrally secured to the cross member 28, and may be secured together by another cross member 34.

The front end of the frame, that is, the front ends of the members 22 rest upon the transversely disposed axle 36 which is mounted on the front end of the sub-frame which will now be described. This sub-frame is constructed in a somewhat similar manner to the manner in which the main frame is constructed and is pivoted at the rear end thereof on the gusset plates 24, by means of a transverse axis member 38. There are two sets of lateral frame members 40, 42 and 44, each set forming a triangle, the apices of the triangles being jointed together at a point indicated at 46, preferably by a short cross member 48 and another cross member 50, the cross member 48 functioning as a support and axis pin for the pulley 52, and the cross member 50 providing support of a pivotal character for the pair of equalizer bars 54, the lower ends of these bars carrying the pulley 56. It should be noted that the forward end of the sub-frame is carried on the axle 36, which axle is terminally equipped with the wheels 58, adapted to contact the ground and to provide for the support of the front portion of the implement.

Intermediate of the length of the upright members 40 of the sub-frame, there is provided a cross member 60 which is preferably channel in form and is provided at each end with a pair of pulleys 62 and 64, and with another pair of pulleys 66 and 68 at points adjacent and on either side of the center point thereof, this channel member 60 being apertured at the center point and at one side, as indicated at 70. It will now be easily understood how a cable 72 is terminally secured to the said right angularly disposed portions 32, near the outer or upper end thereof, or to the cross member 34, the cable being threaded through the pulleys 62 and 64, thence through the channel member 60 and around the pulleys 66 and 68, out through the aperture 70 in the member 60, forwardly and around the second cable 74, as best illustrated in Figure 5, a freely sliding pulley member, not shown in the drawings, being provided to lessen the wear on the cable 74, if desired.

The cable 74 is secured at one end to the drum 76 which is mounted on the drive shaft 78, at the front end of the tractor 10, and driven by the belt 80, there being a pulley 82 provided on the outer end of the drive shaft 78, while the other end of this cable 74 is secured to the cross member 28, the intermediate portion of the cable being threaded through the pulley 52 and the pulley 56 and also passing around the pulley 84 which is mounted to freely rotate on the axle 36.

The operation of this device may now be described in terms of the elements described above. It will be seen that tensioning of the cable 74 by means of operation of the drum 76 will first tend to pull the equalizer bars 54 and the adjacent portions of the cable 74 forwardly, and since the cable 74 passes through a loop in the cable 72, the latter will be tensioned and the rake will be tilted upwardly, with reference to the frame members 22. Further tensioning of the cable 74 cannot be relieved by further movement of the equalizer bars 54 and a lifting action will be transmitted to the cross member 28, whereupon the sub-frame will pivot on the axis member 38, and while the wheels 58 remain on the ground, the frame which is primarily comprised of the members 22 and the rake assembly, is raised, pivoting about the bar 18 in the tractor hitch. If the device is to be used for gathering hay, it will be seen that the rake is adapted to be left in depressed position with reference to the frame, and the frame will also be in depressed position, the implement being pushed ahead of the tractor 10 until the rake is fully ladened with hay, whereupon the cable 74 is tensioned suffiicently to tension the cable 72 and tilt the forward end of the rake upwardly. The implement is then propelled across the field to carry the gathered hay to the position where a stack is to be formed, and by further tensioning the cable 74 the frame with the rake secured on the front thereof can be raised to varying heights as required to facilitate the transference of the hay from the rake to the stack. After the hay has been removed from the rake, the implement can be propelled as desired and the operation repeated.

Obviously many minor changes may be made in the form and proportioning of the various elements of this device and though there has been shown a particular embodiment of this invention, this application is not limited to this particular embodiment, but it is desired to include in the scope of this invention the construction, combination and arrangement of parts and portions substantially as set forth in the appended claims.

Having thus described the invention what is claimed as new and desired to be secured by Letters Patent is:

1. An agricultural implement including a frame having a tractor hitch at the rear end thereof and having a sub-frame pivotally secured thereto intermediate the ends thereof, said sub-frame having ground contacting wheels at the forward end thereof, a rake having a plurality of substantially parallel forwardly extending spaced tangs and right angularly disposed extending portions rigidly secured to a cross member, said cross member being pivotally secured to the forward end of said frame, means to tilt said frame upwardly at the forward end, said sub-frame having a transversely disposed axle on the front end thereof for said wheels, and said frame being supported at the front end by said axle when said frame is in non-elevated position.

2. An agricultural implement including a frame having a tractor hitch at the rear end thereof and having a sub-frame pivotally secured thereto intermediate the ends thereof, said sub-frame having ground contacting wheels at the forward end thereof, a rake having a plurality of substantially parallel forwardly extending spaced tangs and right angularly disposed extending portions rigidly secured to a cross member, said cross member being pivotally secured to the forward end of said frame, means to tilt said frame upwardly at the forward end, said sub-frame having an upwardly extending member with a pulley at the top thereof, a cable secured at one end to said rake, threaded through said pulley and extending rearwardly, whereby said frame may be tilted upwardly at the front end thereof by tensioning said cable, and further means to tilt said rake upwardly at the front end thereof, with reference to said frame.

3. An agricultural implement including a frame having a tractor hitch at the rear end thereof and having a sub-frame pivotally secured thereto intermediate the ends thereof, said sub-frame having ground contacting wheels at the forward end thereof, a rake having a plurality of substantially parallel forwardly extending spaced tangs and right angularly disposed extending portions rigidly secured to a cross member, said cross member being pivotally secured to the forward end of said frame, means to tilt said frame upwardly at the forward end, said sub-frame having an upwardly extending member with a pulley at the top thereof, a cable secured at one end to said rake, threaded through said pulley and extending rearwardly, whereby said frame may be tilted upwardly at the front end thereof by tensioning said cable, and further means to tilt said rake upwardly at the front end thereof, with reference to said frame, said further means comprising said cable, a second pulley engaged by said cable and mounted on a pivoted arm on said sub-frame and a second cable secured to said rake and adapted to be tensioned when said pivoted arm is moved.

4. An agricultural implement including a frame having a tractor hitch at the rear end thereof and having a sub-frame pivotally secured thereto intermediate the ends thereof, said sub-frame having ground contacting wheels at the forward end thereof, a rake having a plurality of substantially parallel extending portions rigidly secured to a cross member, said cross member being pivotally secured to the forward end, said sub-frame having an upwardly extending member with a pulley at the top thereof, a cable secured at one end to said rake, threaded through said pulley and extending rearwardly, whereby said frame may be tilted upwardly at the front end thereof by tensioning said cable, and further means to tilt said rake upwardly at the front end thereof, with reference to said frame, said further means comprising said cable, a second pulley engaged by said cable and mounted on a pivoted arm on said sub-frame and a second cable secured to said right angularly disposed portions and passing around said first mentioned cable adjacent the swinging end of said arm, whereby said rake may be tilted with reference to said frame simultaneously with the tilting of said frame by tensioning of said first mentioned cable.

THOMAS J. YOUNG.
HAROLD N. YOUNG.
JENNINGS BRYAN RAMBO.

REFERENCES CITED

The following references are of record in the file of this patent:

UNITED STATES PATENTS

| Number | Name | Date |
|---|---|---|
| 1,654,323 | Draper | Dec. 27, 1927 |
| 1,702,141 | Velen | Feb. 12, 1929 |
| 2,228,796 | Warren | Jan. 14, 1941 |
| 2,364,470 | Owen | Dec. 5, 1944 |
| 2,367,150 | Spaeth | Jan. 9, 1945 |

FOREIGN PATENTS

| Number | Country | Date |
|---|---|---|
| 30,847 | Germany | Apr. 14, 1885 |
| 696,121 | Germany | Sept. 12, 1940 |